United States Patent [19]

Kataoka

[11] Patent Number: 4,496,114
[45] Date of Patent: Jan. 29, 1985

[54] WINDING SHAFT PROVIDED ON SURFACE WITH SPOOL FIXING ROLLERS

[76] Inventor: Hiroshi Kataoka, 1-5-8 Asahi, Iyo-Mishima-shi, Ehime-ken, Japan

[21] Appl. No.: 398,439

[22] Filed: Jul. 14, 1982

[30] Foreign Application Priority Data

Jul. 22, 1981 [JP] Japan .................. 56-113619
Aug. 3, 1981 [JP] Japan .................. 56-120670
Oct. 13, 1981 [JP] Japan .................. 56-161975

[51] Int. Cl.³ ............................................. B65H 75/24
[52] U.S. Cl. ................................. 242/68.2; 242/72 R
[58] Field of Search ................... 242/46.4, 68.2, 72 R, 242/129.51, 110

[56] References Cited

U.S. PATENT DOCUMENTS

| 734,922 | 7/1903 | Metcalf | 242/46.4 |
|---|---|---|---|
| 1,122,627 | 12/1914 | Milne | 242/72 R |
| 1,289,887 | 12/1918 | Otis | 308/3 R X |
| 2,561,745 | 7/1951 | Lerch | 242/72 R |
| 2,798,678 | 7/1957 | Dadd et al. | 242/72 R |
| 3,007,652 | 11/1961 | Heckman | 242/72 R |
| 3,345,006 | 10/1967 | Geen | 242/68.2 X |
| 3,403,502 | 10/1968 | Caminada | 242/46.4 |
| 3,606,187 | 9/1971 | Hahn | 242/68.2 |
| 3,685,757 | 8/1972 | Fedor | 242/72 R X |

FOREIGN PATENT DOCUMENTS

| 0002429 | 6/1979 | European Pat. Off. | 242/72 R |
|---|---|---|---|
| 0059110 | 9/1982 | European Pat. Off. | 242/58.6 |
| 2421393 | 11/1974 | Fed. Rep. of Germany | 242/72 R |
| 2449724 | 11/1975 | Fed. Rep. of Germany | 242/68.2 |
| 2612375 | 10/1977 | Fed. Rep. of Germany | 242/72 R |
| 2809827 | 9/1978 | Fed. Rep. of Germany | 242/46.4 |
| 53-37190 | 9/1978 | Japan . | |

OTHER PUBLICATIONS

Advertisements, Circle No. 78, 108 & 124, Oct. 1981, issue of "Converter".

Primary Examiner—Stuart S. Levy
Assistant Examiner—Joseph J. Hail, III
Attorney, Agent, or Firm—Oblon, Fisher, Spivak, McClelland & Maier

[57] ABSTRACT

On the circular periphery of a winding shaft, flat recesses are formed at fixed intervals both in the axial and circumferential directions, with small rollers mounted one each on the flat recesses rollably on and inseparably from the flat recesses. A spool for winding a strip of sheet material thereon is slid over the circular periphery of the winding shaft sidewise from one end of the winding shaft. A slight rotation of the spool relative to the winding shaft causes the aforementioned rollers to be moved and wedged into the gap between the spool and the winding shaft, with the result that the spool and the winding shaft are locked to each other.

16 Claims, 60 Drawing Figures

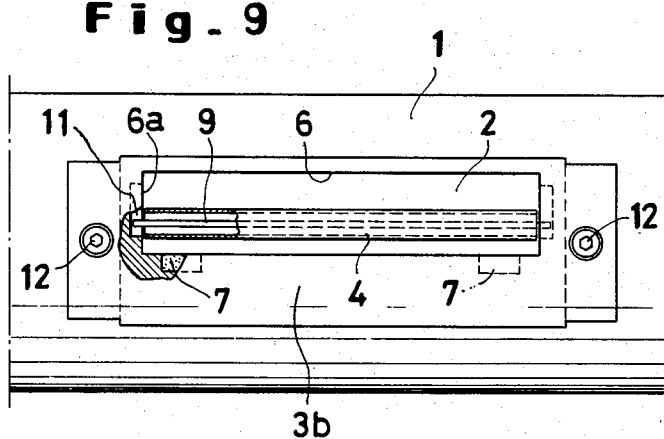
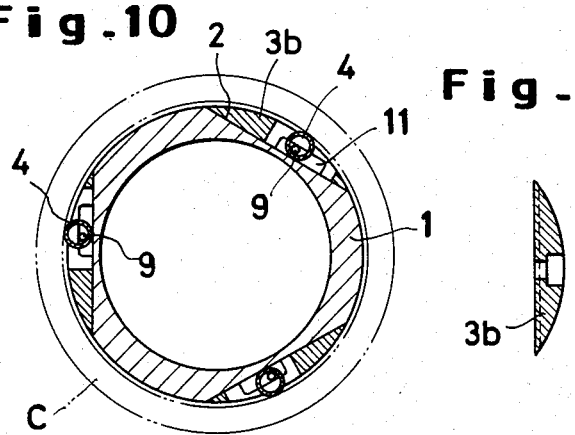
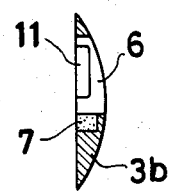
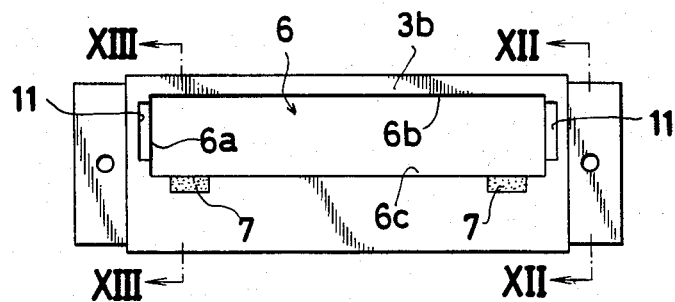

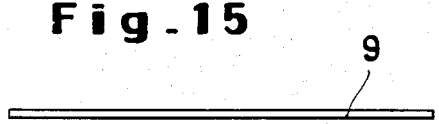
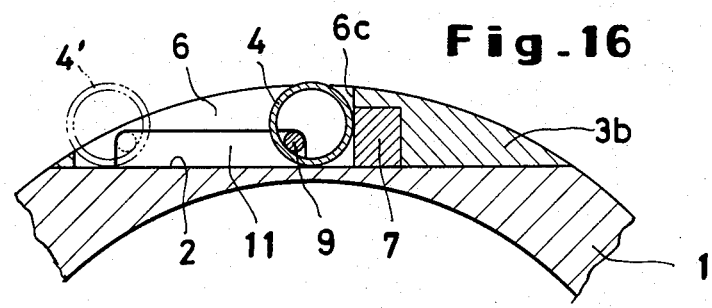
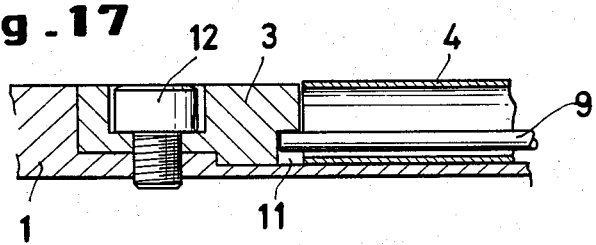
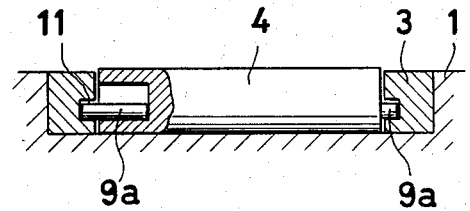
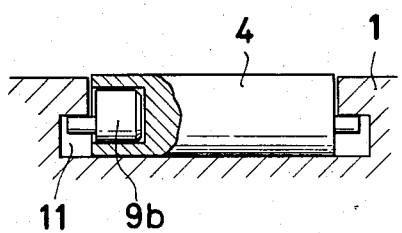

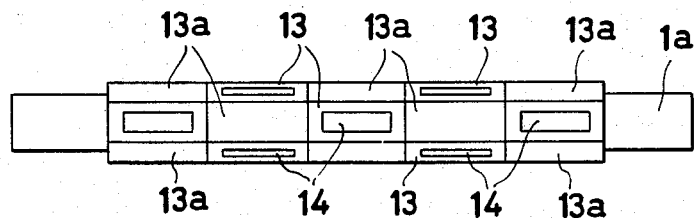
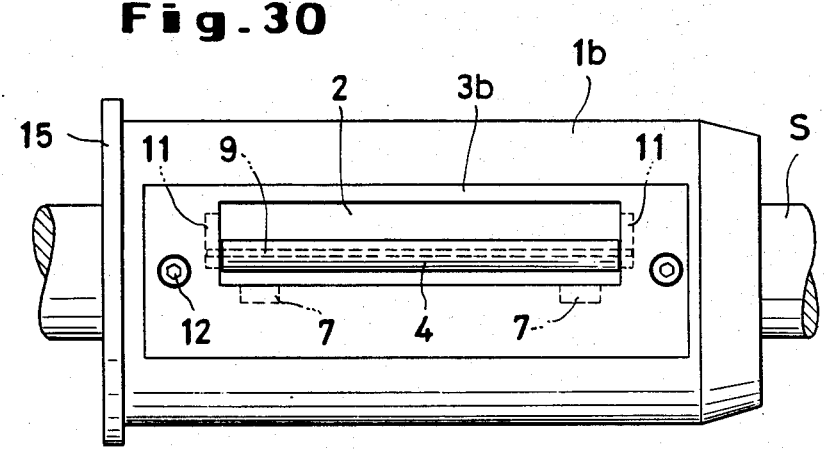
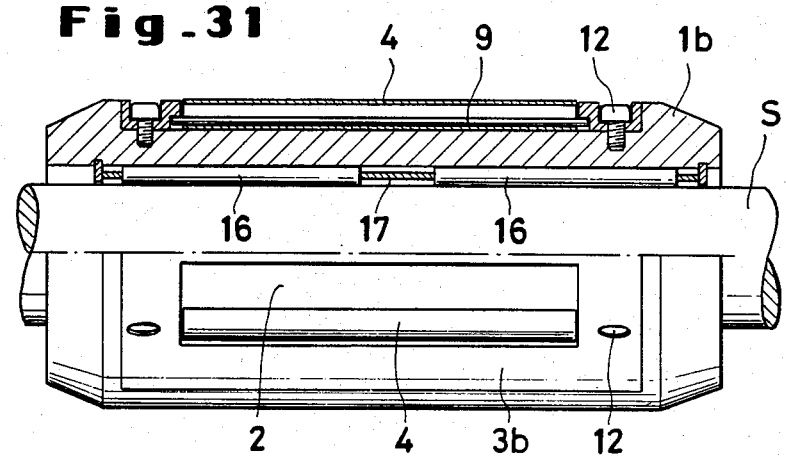

Fig_32
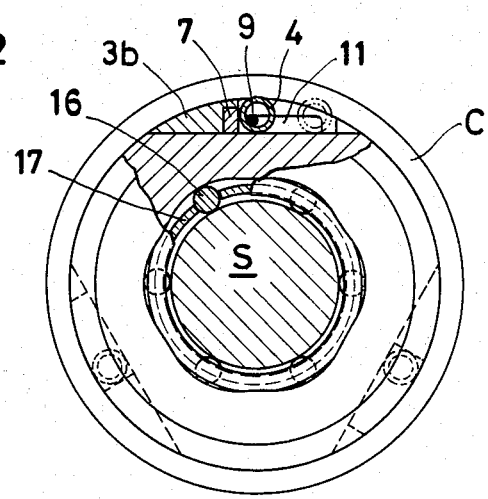
Fig_33
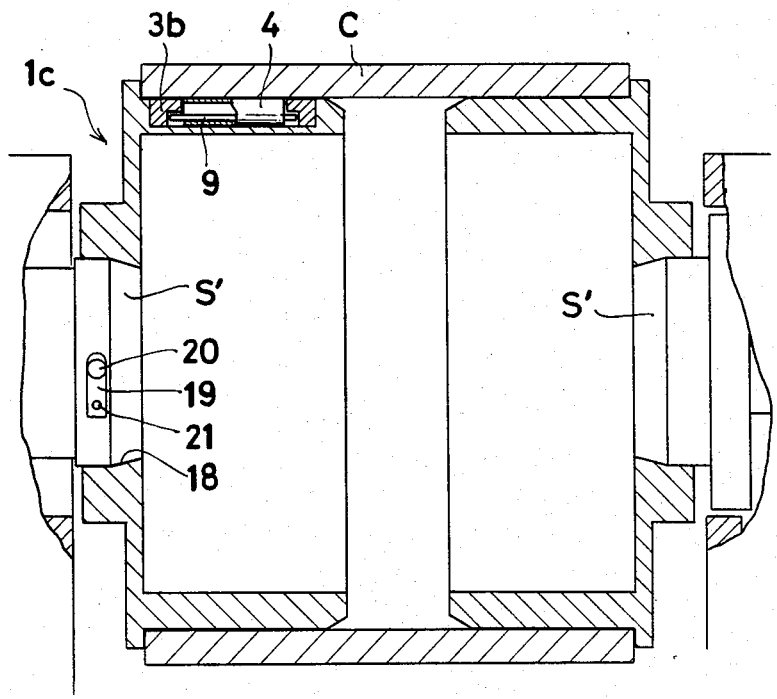

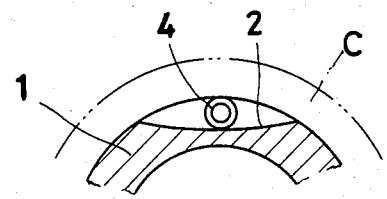
Fig_38
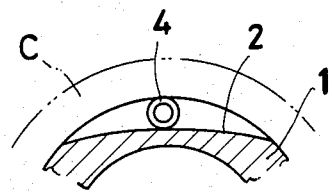
Fig_39
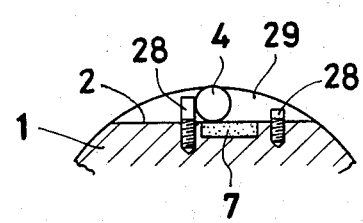
Fig_40
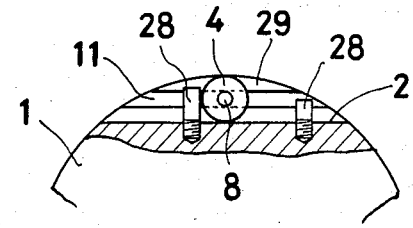
Fig_41
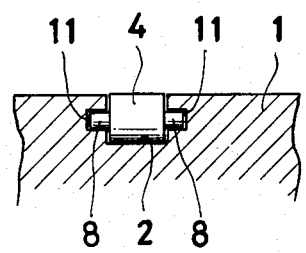
Fig_42
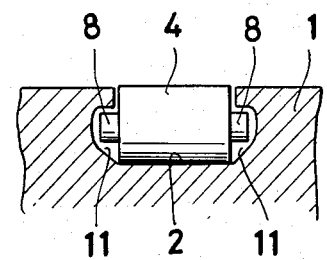
Fig_43

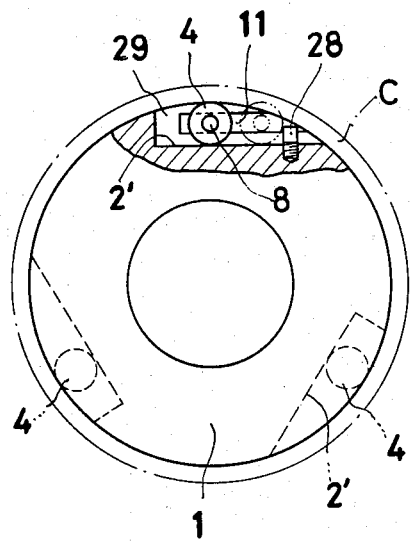
Fig_44
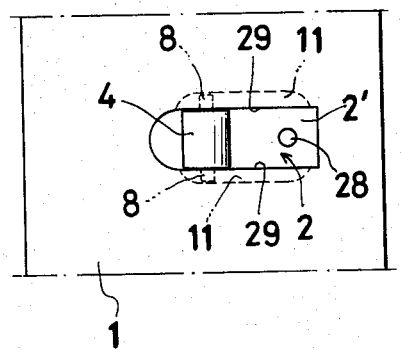
Fig_45
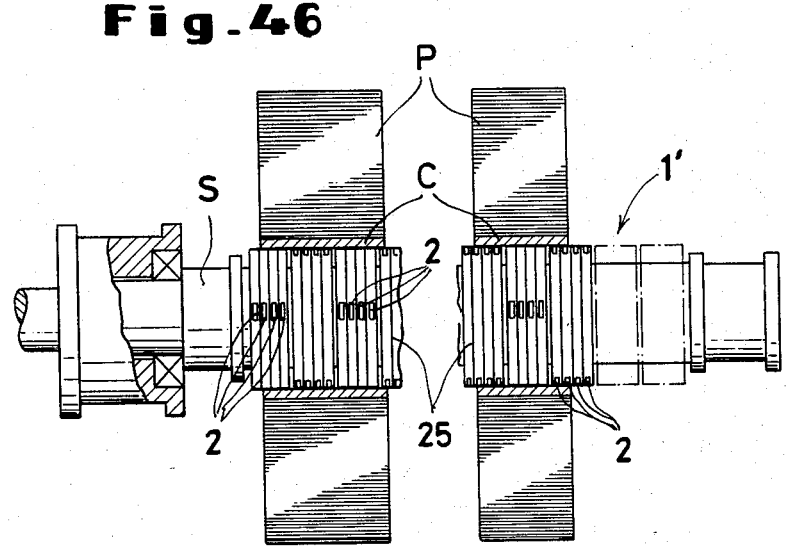
Fig_46

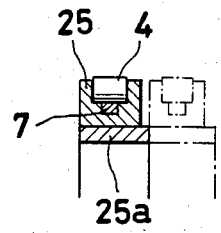
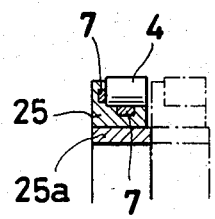
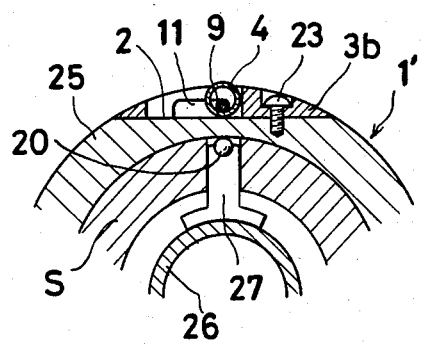
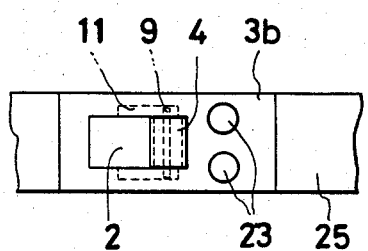
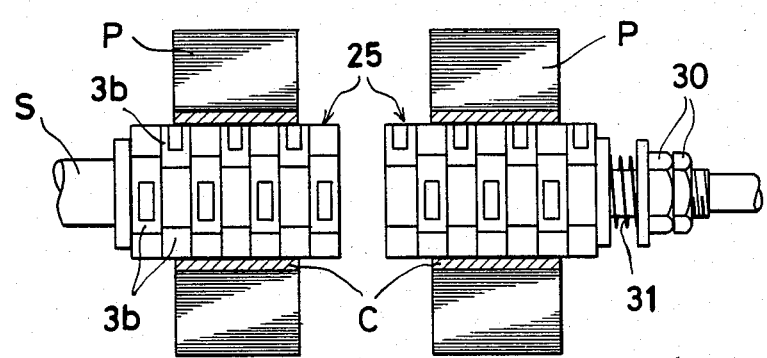

WINDING SHAFT PROVIDED ON SURFACE WITH SPOOL FIXING ROLLERS

BACKGROUND OF THE INVENTION

This invention relates to a winding shaft for a strip of sheet material, and more particularly to a winding shaft of the type provided on the circular periphery thereof with rollers for fixing a spool in position thereon.

In the conventional device in which a strip of sheet material is wound on a spool fixed round a winding shaft, blades are attached in the axial direction to the winding shaft in such a way that the spool may be slid over the winding shaft and removed therefrom and the spool, once fixed in position on the winding shaft, may be rotated in conjunction with the winding shaft. This device has the disadvantage that the inner surface of the spool is injured and the attachment and detachment of the spool to and from the winding shaft are not necessarily effected smoothly.

Recently, a new device in which instead of the blades on the winding shaft, a multiplicity of frictional lugs are pneumatically forced out of the shaft interior so as to protrude from the circular periphery of the shaft and come into forced contact with the inner surface of the spool and impart frictional drive to the spool is finding increasing acceptance.

This so-called "air shaft" indeed enjoys the advantage that it finds no use for blades. Because of the requirement that the aforementioned frictional lugs should be radially forced out of the interior of the winding shaft, however, the winding shaft is complicated in structure, expensive to manufacture, and prone to no few causes for mechanical trouble.

In earlier days, a device in which one groove is formed axially on the circular periphery of a winding shaft throughout the entire length of the shaft and a long bar is inserted into the groove after a spool has been slid over the winding shaft and an improved version of this device in which the long bar is inserted in the groove inseparable in advance of the attachment of the spool to the winding shaft were prevalent. Since these devices both have one long bar wedged into the gap between the winding shaft and the spool, the winding shaft and the spool cannot be retained coaxially and the spool is locally deformed. In either of these earlier devices, the rotation of the winding shaft about its axis causes the spool to produce an eccentric rotation, which constitutes a fatal drawback to the recent high-speed winding operation. Further, when a round bar is inserted as a wedge, since the length of the round bar is so great that the pressure with which the round bar is held in contact with the inner surface of the spool may not be uniform throughout the entire length of the round bar, there is a possibility that only one end of the round bar will force its way into the inner surface of the spool and the other end portion thereof will fail to produce a locking action as expected. When the length of the roller inserted in the groove is appreciably smaller than that of the groove, the portions of the wall of the spool falling directly above the portions of the groove empty of the roller tend to cave in under the pressure exerted by the strip of sheet material being wound on the spool. The device using such a short bar is hardly suitable for accurate winding. Since these problems still remain unsolved, the devices of this principle find no general acceptance today.

SUMMARY OF THE INVENTION

A primary object of this invention is to provide a simple and inexpensive winding shaft which is free from the drawbacks suffered by various winding shafts of the conventional spool-locking mechanism, easy to use, and incapable of inflicting injuries to the spool, causing local deformation of the spool, or producing an eccentric rotation of the spool.

Another object of this invention is to provide a winding shaft which has a plurality of small rollers disposed in a specified manner on the surface of the circular periphery of the shaft so that when a spool for winding a strip of sheet material thereon is slid over the circular periphery of the shaft sidewise from one end of the shaft and the spool is then rotated slightly relative to the winding shaft, the rollers are moved so as to fix the spool to the winding shaft with perfect concentricity with the pressure evenly distributed to all the lines of contact, or to provide a composite winding shaft having the circular periphery thereof formed of a group of collars.

Yet another object of this invention is to provide a winding shaft which has a plurality of flat recesses formed at fixed circumferential intervals on the circular periphery of the winding shaft and has small rollers mounted one each on the flat recesses rollably and inseparably even before the spool is slid over the winding shaft.

A further object of this invention is to minimize the amount of machining to be performed on the winding shaft.

Another object of this invention is to provide several most practical and effective structures which enable the small rollers mounted on the flat recesses in the circular periphery of the winding shaft to be retained rollable on and inseparable from the flat recesses.

Still another object of this invention is to provide a winding shaft which is formed by having small rollers and their respective restraining means disposed one each on the planes of a bar having the cross section of a regular polygon so that the small rollers on the bar fit to the inner surface of the spool and fix the spool in position relative to the polygonal bar.

Yet another object of this invention is to provide a special winding shaft or spool adapter which comprises a plurality of spool supporting members instead of one long winding shaft for locally supporting the interior of a spool, recesses formed on the surfaces of the spool supporting members, small rollers mounted one each on the recesses, and means for retaining the small rollers in position.

A further object of this invention is to provide a winding shaft which has small rollers centrally mounted one each on flat recesses formed in the circular periphery of the winding shaft in such a manner that the small rollers produce a locking motion when the spool is rotated in either direction relative to the winding shaft.

This invention which fulfills all the objects described above, in summary, concerns a winding shaft serving to wind a strip of sheet material thereon and having provided on the circular periphery thereof with rollers for fixing a spool in position on the winding shaft, which winding shaft is characterized by being provided with flat recesses disposed at fixed circumferential intervals in the circular periphery of the winding shaft, the flat recesses being formed by cutting surface segments of a fixed width off the cylinder of the winding shaft; rollers (rolling bars) adapted to be rolled on the flat recesses parallel to the axis of the winding shaft and formed in a thickness such that the rollers, even when located at the positions most distant from the peripheral surface of the winding shaft, slightly protrude from the peripheral surface and, when moved away the positions, protrude increasingly more from the peripheral surface; and means for retaining the aforementioned rollers on the flat recesses in such a manner that the roller may be allowed to roll on the recesses but not allowed to depart from the recesses.

The spool is concentrically restrained at all times to the winding shaft because the rollers are equidistantly distributed on the circular periphery of the winding shaft. Since the rollers are relatively short, they are always moved parallel to the axis of the winding shaft without experiencing the phenomenon that only one end thereof remains in contact with the wall of the spool and that that end therefore rotates faster than the remaining end thereof. The flat recesses are easily produced because they are obtained by cutting surface segments of a fixed width off the cylinder of the winding shaft with a straight cutting edge. These flat recesses are short in the axial direction. The portions which are devoid of such rollers are filled with other members. Thus, the possibility of the wall of the spool being deformed under the pressure exerted by the strip of sheet material being wound on the winding shaft is eliminated.

There are times at which the rollers may be more aptly described as rolling bars, because the present invention embraces not merely rollers of the shape of circular rollers but also bars provided with protuberances, bars of a polygonal cross section, and tubes. Hereinafter, all such rolling bars are collectively referred to as "rollers".

BRIEF DESCRIPTION OF THE DRAWINGS

FIG. 9 is a partial plan view illustrating another embodiment of the present invention, FIG. 10 is a cross section of the embodiment, FIG. 11 is a bottom view of the roller supporting frame used in the embodiment, and FIG. 12 and FIG. 13 are cross sections taken along the lines XII—XII and XIII—XIII of the diagram of FIG. 11.

FIG. 14 and FIG. 15 are explanatory diagrams respectively of a tubular roller and a free cylindrical bar of FIG. 9.

FIG. 16 is a cross section for illustrating the operation of a tubular roller and FIG. 17, is a partial longitudinal, cross section of the tubular roller.

FIG. 18 and FIG. 19 are explanatory diagrams each illustrating a different embodiment of the roller.

FIGS. 22(A)-26(A) are side elevations each illustrating a different embodiment of the flat recess.

FIGS. 22(B)-26(B) are plan views respectively of the five embodiments of the FIGS. 22(A)-26(A).

FIG. 28 is an overall explanatory diagram of the embodiment of FIG. 27.

FIG. 30 is a plan view of one embodiment of the spool supporting device.

FIG. 31 is a partial longitudinal cross section of another embodiment of the spool supporting device.

FIG. 32 is a lateral cross section of the embodiment of FIG. 31.

FIG. 33 is a cross section of one embodiment of the present invention applied to the edge adapter for a spool.

FIGS. 37, 38, and 39 are lateral cross sections each illustrating a different embodiment of the present invention wherein the recesses are not perfect planes, FIGS. 40 and 41 are lateral cross sections each illustrating a different embodiment of the recess of a type having no use for a roller supporting frame, FIGS. 42 and 43 are longitudinal cross sections each illustrating a different recess of the same type having a lateral wall and a lateral groove, FIGS. 44 and 45 are a lateral cross section and a plan view illustrating one embodiment of the recess of the same type except that the cutting of a surface segment is discontinued halfway along the entire cutting length, FIG. 46 is an elevation showing a composite winding shaft having the circular periphery of the winding shaft formed of groups of collars, FIGS. 49 and 50 are partial cross sections each of a different embodiment of the collar, FIGS. 51 and 52 are a lateral cross section and a plan view respectively of an essential part of a different composite winding shaft, and FIG. 53 is an elevation illustrating a composite winding shaft of another model.

DETAILED DESCRIPTION OF THE INVENTION

Figure 1:
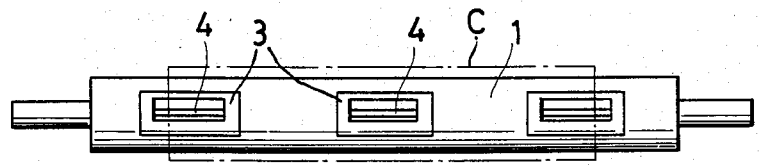
FIG. 1 and FIG. 2 are overall explanatory diagrams each of a different preferred embodiment of the winding shaft of this invention. The two embodiments differ in structure of the roller supporting frames attached to the flat recesses for preventing the rollers from falling off the flat recesses.
Figure 4:
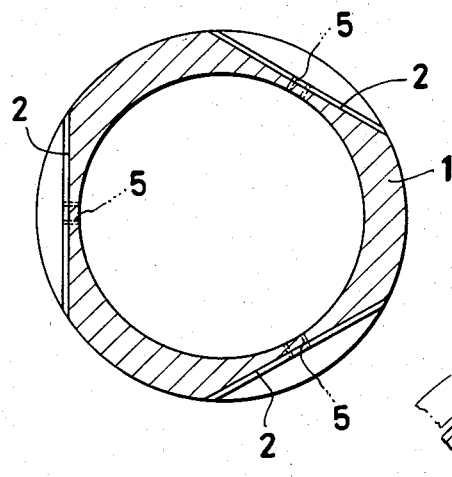

Now, the present invention will be described with reference to the accompanying drawings. FIG. 1 represents one preferred embodiment of this invention. A spool c is fitted round a winding shaft 1. A strip of sheet material is wound on this spool c or a roll of the strip of sheet material already formed on the spool c is paid off. In this case, the winding shaft 1 is provided therein with flat recesses 2 disposed at locations falling in three equally spaced axial rows and three equally spaced circumferential files (FIG. 4). Roller supporting frames 3 adapted to fit the flat recesses are attached thereto and smaller rollers 4 are set in position one each within the roller supporting frames 3.

Figure 2:
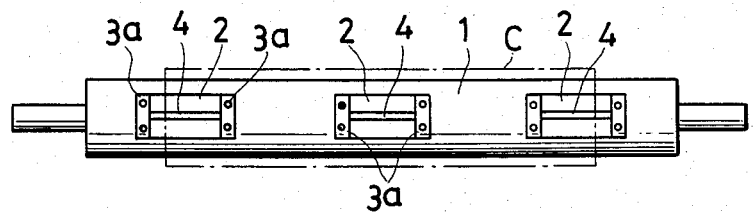
Figure 7:
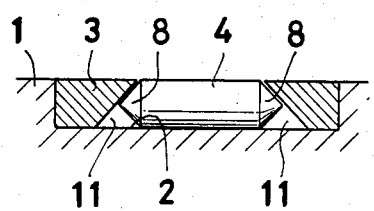
FIG. 7 and FIG. 8 are explanatory diagrams each of a different roller.
Figure 8:
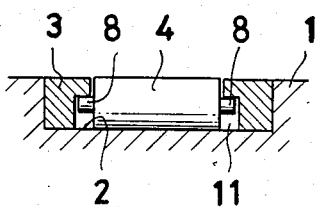

The embodiment of FIG. 2 in type belongs to the embodiment of FIG. 1. In this embodiment, the smaller rollers are supported in position by a pair of opposed lateral frames 3a instead of the supporting frames 3 of FIG. 1 which are in the shape of picture frames (or window frames). The opposed surfaces of the lateral frames are each provided with a transverse groove 11 for retaining the roller 4 as illustrated in FIG. 7, FIG. 8 and FIG. 18. These grooves prevent the roller 4 from falling off the winding frame 1.

Figure 3:
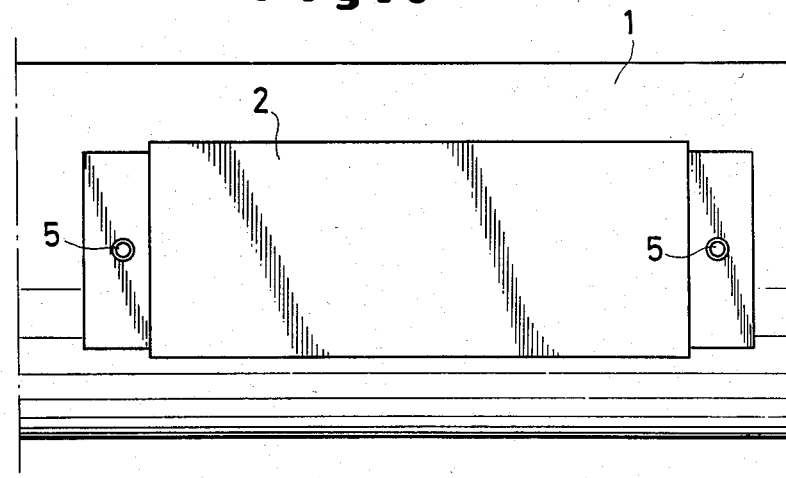
FIG. 3 is a plan view illustrating a typical flat recess formed by cutting a surface segment off the cylinder of the winding shaft and FIG. 4 is a cross section of the winding shaft containing such flat recesses.

The flat recess 2 of the winding shaft of FIG. 1 is illustrated in a plan view in FIG. 3 and in a cross section in FIG. 4, both enlarged. The roller supporting frame 3 which is attached to the flat recess 2 is illustrated in a plan view in FIG. 5. The working condition in which the roller 4 is set in position substantially under the window (opening) of the supporting frame 3 attached to the flat recess 2 is illustrated in a cross section in FIG. 6.

Basically this invention is characterized by the three elements, i.e. the flat recesses 2, the rollers (rolling bars) 4 and the roller retaining means.

The flat recesses 2 are disposed as equally spaced circumferentially in the circular periphery of the sheet winding shaft 1. They are flat faces which are formed by cutting surface segments of a required width off the winding shaft which is a bar of a circular cross section. The transverse cutting of such surface segments is accomplished by advancing a cutting blade from one side of the winding shaft to the other side. Optionally, the cutting may be discontinued part way along the entire width of the cutting. Typical examples of the complete cutting are found in FIGS. 3 and 4 and typical examples of the partial cutting in FIGS. 44 and 45. In either case, the cutting is accomplished by one stroke of end mills 120 mm and 20 mm in size perpendicularly to the axis of the winding shaft on a large milling lathe. Compared with the groove cut in the longitudinal direction in the conventional locking type winding shaft, these flat recesses are formed with notable ease.

The rollers (in the broad sense embracing bars provided with protuberances, bars of polygonal cross section, bars of deformed cross sections, and tubes of similar shapes as well as bars of circular cross section) 4 are adapted to be rolled on the flat recesses always in a posture parallel to the axis of the winding shaft 1 and are formed in a thickness such that the rollers, even when located at positions most separated from the peripheral plane of the winding shaft 1, slightly protrude from the peripheral surface and, when moved away those positions, protrude increasingly more from the peripheral surface. In the embodiment of FIG. 1, the rollers have one fixed outside diameter of 7 mm and two different lengths of 100 mm and 50 mm. Although the sizes of the rollers are left to be chosen by designers, both thickness and length are not desired to be appreciably increased from the values mentioned above. When the thickness is too large, there arises a possibility of the rollers producing an eccentric error. When the length is too large, there arises a possibility of the rollers failing to move parallel to the axis of the winding shaft.

The roller retaining means differ from one embodiment to another of the winding shaft and, therefore, ought to be described more conveniently with reference to their pertinent embodiments. Only broadly, they may be divided into two types, the one type using roller supporting frames 3 for the retention of rollers and the other type using retaining members directly fixed on winding shafts 1 instead of using roller supporting frames. In the first part of the specification, those embodiments using supporting frames 3 will be described and in the last part, those embodiments using no supporting frames 3 will be described.

Figure 5:
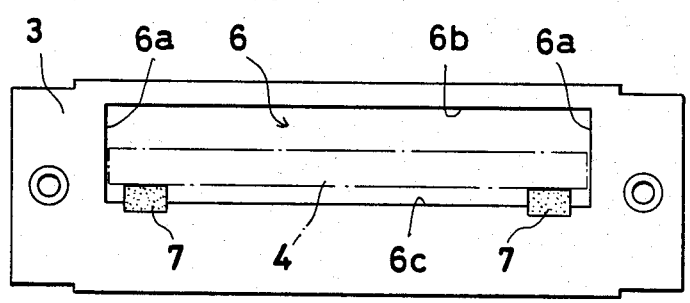
FIG. 5 is a plan view illustrating a typical roller supporting frame of the shape of a picture frame to be attached to the flat recess of FIGS. 3-4.

To begin with, the embodiment of FIG. 1 will be described in detail. In this embodiment, the opposite end parts of each flat recess form slightly raised steps having a threaded hole 5 perforated therein. The supporting frame 3 illustrated in FIG. 5 is fastened to the flat recess with screws driven into the threaded holes 5.

In the present embodiment, the upper surface of the supporting frame 3 is adapted to conform to the peripheral surface of the winding shaft 1. Optionally it may be formed in a height slightly below the peripheral surface. The supporting frame 3 is only required to guide the roller 4 in a straight course perpendicular to the axis of the roller, regulate the distance in which the roller 4 is allowed to roll on the flat recess, and prevent the roller from falling off the flat recess.

In the embodiment of FIGS. 3-6, the rolling motion of the roller 4 is guided straight and regulated as the end faces of the roller 4 roll on the opposite lateral walls 6a of the window hole 6 in the frame 3, and the distance of the rolling motion is regulated by the front and rear sides 6b, 6c of the window hole 6 serving as stoppers. Incidentally, in this embodiment, permanent magnets 7 are embedded in the rear side of the window hole 6 to serve as means for preventing the roller 4 from falling off the winding shaft. In fact, these permanent magnets 7 function as stoppers. The roller 4 of FIG. 6 has a thickness such that, when located at the position of the flat recess 2 indicated by the solid line in the drawing, namely the position most separated from the peripheral surface of the winding shaft, the roller 4 comes into contact with the inner surface of the spool c, although the contact is not made so powerfully as to restrain the spool c. When the shaft 1 is rotated in the direction of the arrow relative to the spool c, the roller 4 rolls on the flat recess in the direction of the position indicated by a chain line in FIG. 6, namely, in the direction in which the depth of the supporting frame 3 decreases. As in a roller clutch, the roller 4 advances and finally wedges itself where the inner surface of the spool c and the upper surface of the flat recess 2 approach each other to less than the thickness of the roller 4. In this manner, the spool c is forcefully locked to the shaft 1 by means of three rollers 4 spaced in one circumferential file on the shaft. Since the pressure with which the spool c is locked to the winding shaft 1 is dispersed by the uniformly spaced rollers, the spool c is not suffered to sustain local deformation. When the relative rotation is imparted in the reverse direction to the shaft 1 or the spool c, the roller 4 immediately returns to the position indicated by the solid line and releases the spool c from the lock. At this release position, the roller 4 is attracted fast to the permanent magnet 7. Thus, the roller 4 has no possibility of being separated from the shaft 1 even after the spool c has been removed from the shaft.

The embodiment so far described forms one of the fundamental aspects of this invention. The flat recess 2, the roller supporting frame 3, the roller 4 and the roller retaining means may be modified in various ways without altering the spirit of the present invention. For example, the flat recess 2 may be modified as illustrated in the embodiments of FIGS. 22–26, which will be described afterward. And, the roller supporting frame 3 may be formed with a pair of opposed pieces 3a as illustrated in FIG. 2 or it may be formed by omitting the front side 6b of the supporting frame 3, leaving behind the three sides, i.e. the lateral walls 6a and the rear side 6c, of the rectangle of the supporting frame 3, and having a setscrew separately raised from the flat recess to serve as a front stopper for the roller 4. These components may be modified otherwise than as specifically illustrated above. The means for preventing the fall of the roller 4 need not be limited to permanent magnets, but may be formed by raising protuberances 8 from the opposite ends of the roller 4 so that the engagement of the protuberances with the lateral walls of the supporting frame 3 will prevent the roller from falling off the winding shaft as illustrated in FIGS. 7–8 or by forming the roller in the shape of a tube adapted to roll on the flat recess 2 inside the supporting frame 3, passing a slender axle 9 through the interior of the tubular roller 4, and allowing the opposite ends of the axle 9 to enter the opposed lateral grooves 11 on the opposite side walls of the frame 3 instead of the aforementioned protuberances 8 so that the tubular roller may be allowed to move within a short distance and prevented from falling off the winding shaft. Otherwise, by connecting the roller 4 to coil springs 10, desired prevention of the roller 4 from falling out may be obtained. The aforementioned roller retaining means such as permanent magnets, terminal protuberances of the roller, slender axle, and springs may be suitably combined to effect desired prevention of the roller from falling out.

Figure 6:
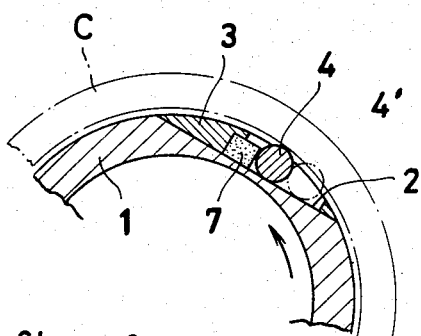
FIG. 6 is a partial cross section illustrating a condition in which the roller supporting frame of FIG. 5 is attached to the winding shaft of FIGS. 3-4, a roller is set in position within the roller supporting frame, and a spool is set in position round the circular periphery of the winding shaft.

In the embodiment of FIGS. 9 and 10, since the inside diameter of the tubular roller 4 is greater than the outside diameter of the axle 9, the amount of the roller 4 which protrudes from the outer periphery of the shaft 1 when the roller 4 has advanced to the position of a narrow depth, namely the position of 4', as shown in FIGS. 16 and 17 is notably larger than in the embodiment of FIGS. 5 and 6. This embodiment, therefore, has the advantage that the failure of the spool to be locked to the winding shaft due to insufficient protrusion of the roller does not happen even when the gap between the winding shaft 1 and the spool c is large.

The bottom view of the supporting frame 3b, which is a component in the embodiment of FIGS. 9 and 10 is illustrated in FIG. 11. The cross section of the supporting frame 3b taken along the line XII—XII in the diagram of FIG. 11 is shown in FIG. 12 and the cross section thereof taken along the line XIII—XIII in the diagram of FIG. 11 is shown in FIG. 13. A knurled tubular roller is illustrated in FIG. 14, and a free axle 9 is illustrated in FIG. 15.

Comparison of the supporting frames 3, 3b used in the embodiments of FIG. 5 and FIG. 11 reveals that they differ in respect that the supporting frame 3b of FIG. 11 is provided on the undersides of the opposite side walls 6b of the window hole 6 with lateral grooves 11. The opposite ends of the axle 9 are inserted in the lateral grooves 11 and are allowed to move along the lateral grooves 11 in concert with the rolling motion of the roller 4.

Figure 20:
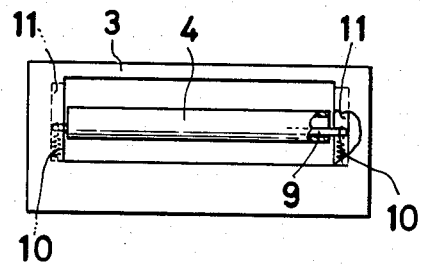
FIG. 20 and FIG. 21 are plan views each illustrating a different embodiment using a coil spring as means for restraining the tubular roller.
Figure 21:
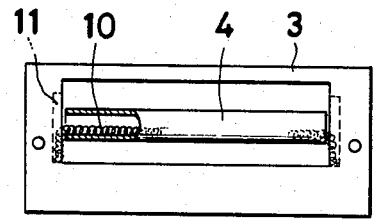

The supporting frame 3 is attached to the flat recess 2 with sunk bolts 12 lest the supporting frame 3 should protrude from the peripheral surface of the winding shaft 1. In the embodiment of FIG. 16, a permanent magnet 7 is used for the attraction of the roller 4. Optionally, the attractive force of the permanent magnet 7 may be replaced by the tractive force of a spring 10, as shown in FIG. 21, the two forces may be utilized simultaneously, or coil springs 10 may be used to draw the opposite ends of the axle 9, as shown in FIG. 20. Any of these various devices is only required to enable the roller 4 to be freely rolled within a desired distance and to be prevented from falling off the supporting frame 3 which has been attached fast to the flat recess 2. When the spool c is set in position on the periphery of the winding shaft to which the supporting frames 3 have been fastened, the shaft 1 is rotated in the winding direction or in the unwinding direction relative to the spool c. Consequently, the rollers 4 held in contact with the inner surface of the spool c are frictionally rolled toward the decreasing depth of the supporting frame 3 and finally allowed to lock the spool c to the shaft 1. When the shaft 1 is rotated in the reverse direction, the roller 4 is rolled toward the increasing depth of the supporting frame 3 and allowed to release the spool c from the shaft 1. The size of all the components involved here are fixed in advance in consideration of the locking and unlocking motions described above.

FIGS. 18 and 19 represent rollers 4 of a type intermediate between the cylindrical rollers as illustrated in FIGS. 7 and 8 and the tubular rollers as illustrated in FIG. 14. The axle 9a of the roller of FIG. 18 is short and thin and is allowed to move freely within the recess formed in each of the end faces of the roller 4 and consequently keep the roller 4 from falling off the winding shaft. The axle 9b of the roller of FIG. 19 differs from that of FIG. 18 in respect that it consists of a major-diameter portion adapted to slide into fast engagement with the recess formed in each of the end faces of the roller 4 and a minor-diameter portion adapted to move within the lateral groove 11. The lateral groove 11 is dug directly in the side wall of the flat recess instead of in the supporting frame 3.

Figure 22A:
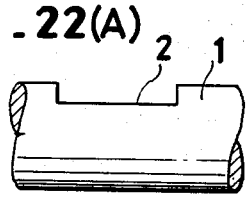
Figure 22B:
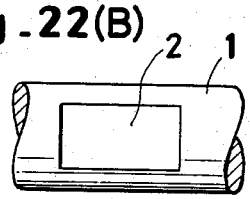

In each of the embodiments described above, the flat recess 2 is in the shape of a rectangular plane as illustrated in FIG. 22(A) or FIG. 22(B).

Figure 23A:
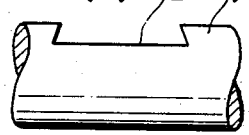
Figure 23B:
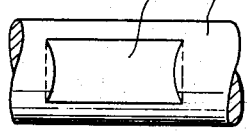
Figure 24A:
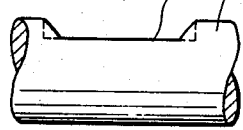
Figure 24B:
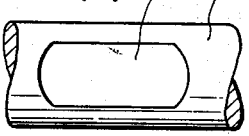
Figure 25A:
Figure 25B:
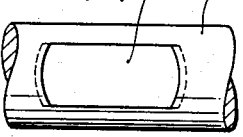
Figure 26A:
Figure 26B:
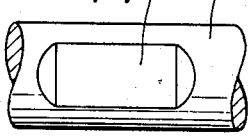

In transversely cutting surface segments from the cylinder of the winding shaft 1, a recess containing dovetails one each at the opposite ends as illustrated in FIGS. 23(A), 23(B) may be cut by imparting a sideward shift to the movement of the blade or changing the shape of the blade. The supporting frame is inserted sidewise into this recess. The opposite side walls of the recess may be curved as illustrated in FIGS. 24(A), 24(B), so that the supporting frame 3 may be vertically inserted into the recess from above. Otherwise, the opposite side walls of the recess may be curved and, at the same time, slanted inwardly so as to nip the supporting frame 3. In this case, the supporting frame 3 is made of a material rich in elasticity such as, for example, a plastic material, so that it may be inserted as slightly bent inwardly into the recess. Optionally, the opposite side walls of the recess may be gradually inclined as illustrated in FIGS. 26(A), 26(B), so that otherwise possible concentration of strain may be avoided. Thus, the shape of the flat recess may be freely modified so as to suit design conditions.

This invention has materialized, for practical use, a winding shaft of the type permitting simple and convenient attachment and detachment of a spool, which winding shaft has formed in the peripheral surface thereof flat recesses containing a roller so that the rollers on the flat recesses, when caused to roll on the flat recesses by virtue of their friction against the inner surface of the spool, will lock the spool to the winding shaft or unlock it from the winding shaft. In each of the embodiments so far described, since regulation of the movement of rollers and prevention of the rollers from falling out are effected by the support frame which is an independent component from the winding shaft, the cutting work to be performed on the long winding shaft is minimized. Since the supporting frames are separately fabricated, they can be produced with high accuracy. When such supporting frames are mass produced in the form of accurately molded products or plastic products, there can be offered a novel winding shaft which is a composite of a steel shaft and a part of some other material. By adoption of this new winding shaft, all the aforementioned problems suffered by the conventional winding shaft which locks the spool to the shaft by means of compressed air may be avoided. In the winding shaft of this invention, the attachment and detachment of the spool is effected with ease and the locking and unlocking of the spool can be accomplished by slightly rotating the spool or shaft relative to each other. The rollers disposed one each in three equally spaced rows in a plurality of spaced circumferential files produce a powerful locking force because they are used after the manner of wedges and, while the spool is locked to the winding shaft, forcibly keep the axis of the spool and that of the winding shaft substantially to coincide with each other. Since the locking force is evenly distributed to all the rollers, the pressure applied is not so much as to cause local deformation of the spool.

The flat recesses which constitute one essential component of the present invention are produced by cutting surface segments off the cylinder of the winding shaft as described above. The winding shaft containing flat recesses which is contemplated by this invention may be otherwise obtained by preparing a bar of a polygonal cross section, having pertinent areas of the peripheral planes enclosing this polygonal bar left intact to serve as flat recesses, and covering the remaining areas with segments designed to complete a circular periphery.

Figure 27:
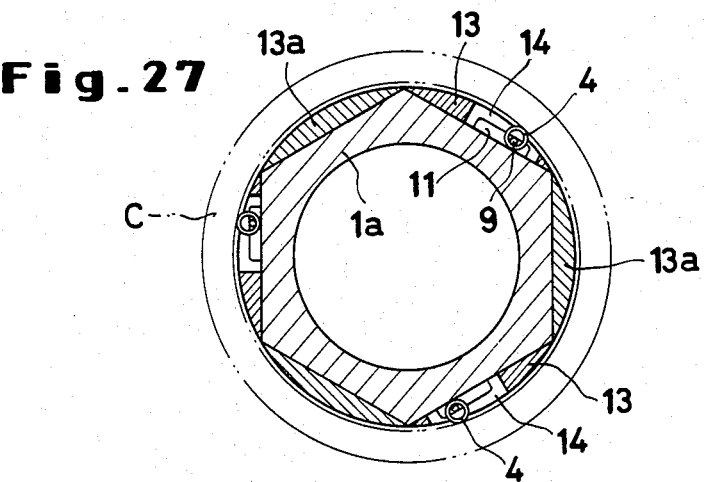
FIG. 27 is a cross section of an embodiment of the winding shaft formed of a bar of a polygonal cross section.
Figure 29:
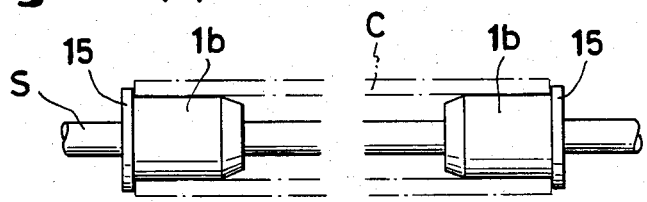
FIG. 29(A), 29(B), and 29(C) are explanatory diagrams each of a different embodiment wherein the present invention is applied to a winding shaft provided with a spool supporting device.
Figure 29:
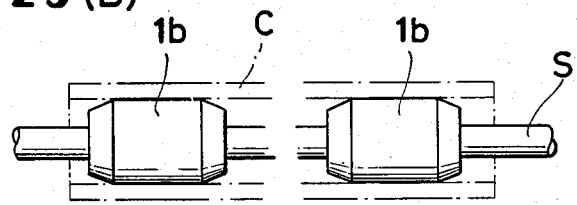
Figure 29:
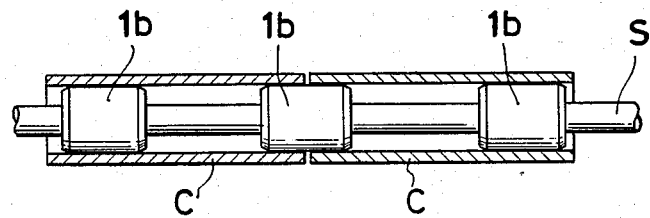
Figure 34:
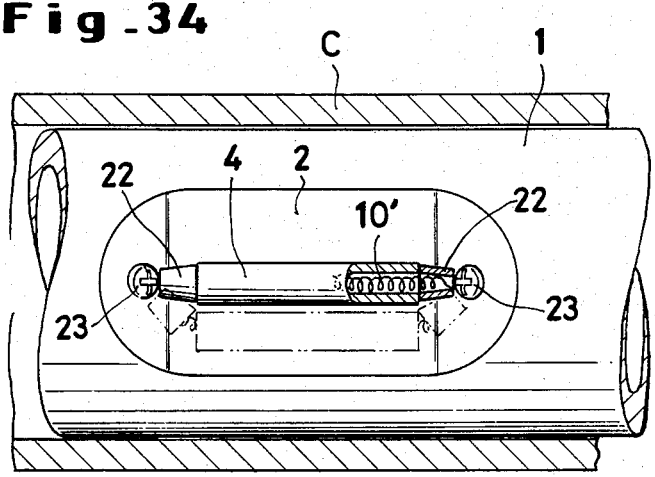
FIG. 34 is a plan view of an essential part in an embodiment of the present invention wherein the spool can be locked to the winding shaft when it is rotated in either circumferential direction relative to the winding shaft and FIG. 35 is a longitudinal cross section of that embodiment.
Figure 35:
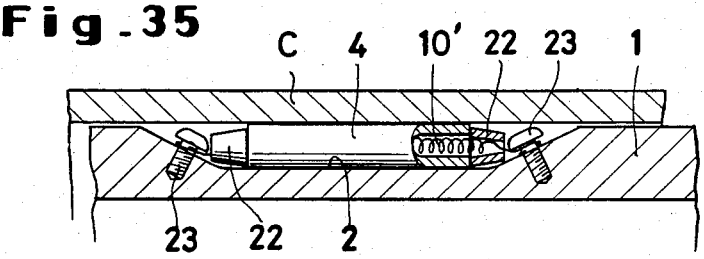

FIG. 28 represents one embodiment of the winding shaft produced out of a polygonal bar as just mentioned. A cross section of this winding shaft is illustrated in FIG. 27. The essential parts of this winding shaft include a polygonal bar which is a hexagonal steel tube 1a in the present embodiment, surface segments 13 adapted to be attached to all or part of the areas of the peripheral planes of this polygonal bar 1a, possessed of outer surfaces such as to convert the polygonal periphery of the bar 1a to a circular periphery smoothly fitting the inner surface of the spool c for winding a strip of sheet material thereon, and allowing part of the surfaces of the polygonal bar 1a to be exposed to serve as the rotating planes for rollers 4, namely as the cut portions 14 in the present embodiment, the rollers 4 capable of being rolled on the peripheral planes of the polygonal bar 1a inside the cut portions 14, and having a thickness such that even when the rollers are located at the positions most separated from the circular periphery of the aforementioned surface segments 13, they slightly protrude from the circular periphery and, as they roll out of these positions, they protrude increasingly more from the circular periphery, and means for retaining the aforementioned rollers in such a manner that the rollers are allowed to be rolled within the aforementioned cut portions 14 and prevented from falling off the winding shaft, which means in the present embodiment comprises an axle 9 passed through the tubular roller 4 and opposite lateral grooves 11 for admitting the ends of the axle 9.

In the present embodiment, surface segments 13 and windowless surface segments 13a having the same dimensions as the surface segments 13 and lacking window-like cut portions 14 are alternately disposed. The surface segments 13 are perfectly identical in shape with the roller supporting frames 3b of FIG. 16 and do not require any explanation. Optionally, the surface segments 13 may be formed in the shape of the opposed supporting frames of FIG. 2.

The opposite ends of the polygonal bar 1a are machined similarly to those of the ordinary winding shaft 1.

The winding shaft which is formed out of a polygonal bar has a great advantage that the cutting work required in cutting flat recesses in the cylinder of the winding shaft can be completely eliminated.

As described above, in the basic aspect of the present invention, the rollers for locking the spool c are disposed equidistantly also in the longitudinal direction throughout the entire surface of the winding shaft 1 which has a greater length than the spool c. The present invention, however, is still applicable to a construction wherein the strip of sheet material is wound on the spool c which is supported only at the opposite ends thereof by supporting means and to a construction wherein the spool c is rotated by having adapters inserted to the opposite ends of the spool c and rotating the adapters by means of a drive shaft.

FIGS. 29-32 represent embodiments of the supporting device 1b for the inner surface of the spool c and FIG. 33 represents an embodiment of the adapter 1c for the spool c. Light-weight winding shafts capable of locking and driving spools of different lengths or a plurality of spools of a fixed length as illustrated in FIGS. 29(B), 29(C) are obtained by fitting several spool supporting flangeless devices 1b having an outside diameter equalling the inside diameter of the spool c on the outer periphery of a driving shaft S.

The embodiments of FIGS. 29-32 are winding shafts invariably provided with spool supporting devices 1b which are fitted round the drive shaft S so as to support and restrain locally the inner surface of the spool c. They have three essential components, i.e. flat recesses 2 disposed as equally spaced in the circumferential direction on the outer periphery of the spool supporting device 1b of the shape of a short tube, the flat recesses 2 being formed by cutting surface segments of a desired width off the tube; rollers 4 adapted to be rolled on the aforementioned flat recesses 2 always in a posture parallel to the axis and having a thickness such that even when the rollers are located at the positions most separated from the peripheral surface of the supporting device 1*b*, the rollers slightly protrude from the peripheral surface and, as the rollers are rolled out of the positions, they protrude increasingly more from the peripheral surface; and means for restraining the aforementioned rollers 4 in such a manner that the rollers 4 are allowed to roll on the surface of the aforementioned flat recesses and prevented from falling off the supporting device 1*b*, which means in the present embodiment comprises an axle 9 passed through the tubular roller 4 and a roller supporting frame 3*b* containing a pair of opposed lateral grooves 11.

The roller supporting frames 3*b* fitted to the flat recesses 2 are identical to those of FIG. 9 and, therefore, do not require any explanation. Since the flat recesses 2 are disposed one each at three equally spaced positions on the circumference, the axis of the supporting device 1*b* and that of the spool c are always allowed to coincide with each other when the spool c is in a locked state. Since the supporting device 1*b*, despite the absence of a flange 15, is still capable of restraining the spool c from lateral motion, it can withstand high-speed rotation. The supporting devices 1*b* of FIGS. 29(B), 29(C) need not be moved even when the lengths of the spools c are slightly changed. The supporting devices 1*b* of FIG. 29(C), when desired, may be released from the engagement with the drive shaft S and moved by means of flanges 15 of the supporting devices 1*b* until they pinch the opposite ends of the spool c. FIGS. 31, 32 represent one typical locking mechanism disposed inside the supporting device 1*b*. The inner surface of the supporting device 1*b* has the shape of a rounded corrugated rectangle. Slender inner rollers 16 are placed one each in the ridges of the corrugated surface and are supported in position by a cylindrical supporting basket 17. In this arrangement, the drive shaft S is easily admitted when the inner rollers 16 take their positions in the ridges of the inner surface of the supporting device 1*b* and the supporting device 1*b* is locked when the drive shaft S begins to rotate and the inner rollers are consequently caused to move out of the ridges.

The spool adapters 1*c* of FIG. 33 may well be regarded as one type of supporting devices 1*b* which are fitted around the drive shaft S to support and restrain the inner surface at the opposite ends of the spool c as illustrated in FIG. 29(A). In this embodiment, however, the drive shaft S is replaced by shaft heads S' adapted to support the opposite ends of the spool c. Thus, the spool adapters 1*c* are provided with fixing holes 18 which are easily attached to and detached from the shaft heads S'. The spool adapters are set in position in the ends of the spool c in advance. Since the fixing holes 18 are readily attached to and detached from the drive shaft heads S', spools of various sizes may be attached to one and the same drive shaft heads S' when fixing holes 18 of various sizes are prepared.

The portions of the adapters 1*c* which enter the inner surface of the spool c are identical with those of the supporting devices 1*b* of FIGS. 30, 31. The fixing holes 18 for the adapters 1*c* have an inside shape conforming to the outside shape of the shaft heads S'. The steel balls 20 which are adapted to roll on the grooves 19 at three equally spaced positions on the outer periphery of the shaft heads S' function similarly to the rollers 4 of this invention to lock the shaft heads S' and the adapters 1*c* to each other.

To prevent the steel balls 20 from falling off the grooves 19, the upper edges of the opposite ends of the grooves 19 are pushed out inwardly by means of a chisel or some other suitable implement and stop pins 21 are raised in the shallow portions of the grooves 19.

The adapter 1*c* on the lefthand side in FIG. 33 is fastened to the shaft head S' and the spool c and the adapter on the righthand side may be incapable of locking the spool c.

Now, a two-way locking type winding shaft contemplated by the present invention will be described with reference to FIGS. 34–37.

Again in the present embodiment, the essential components are flat recesses 2, rollers 4, and roller retaining means. The flat recesses are disposed generally equidistantly in the circumferential direction and the axial direction on the outer periphery of the winding shaft 1. These flat recesses are formed by cutting surface segments of a desired width off the cylinder of the winding shaft. The rollers 4 which are rolling bars are adapted to be rolled on the flat recesses at all times in a posture parallel to the axis of the winding shaft 1. They have a thickness such that even when they are located at the positions most separated from the peripheral surface of the winding shaft 1, they slightly protrude from the peripheral surface of the winding shaft 1 and, as they are rolled out of the positions, they protrude increasingly more from the peripheral surface. The salient feature of the present winding shaft resides in being provided with coil springs 10' which connect the rollers 4 on the center lines of the flat recesses parallel to the axis of the winding shaft 1 to the fixing devices at the opposite ends of the flat recesses 2.

The two-way locking system makes use of the fact that the flat recesses 2 of the present invention are not axial grooves found in the conventional countertypes but flat faces formed by cutting surface segments of a required width off the cylinder of the winding shaft 1. The rollers 4 are placed along the center lines of these flat recesses, sockets 22 are applied to the opposite ends of the rollers and supported in position by opposite setscrews 23, and the coil springs 10' are passed through the rollers 4 and the sockets 22 and fastened at their opposite ends to the flat recesses 2. When either the spool c or the winding shaft 1 is rotated in either direction relative to each other, the rollers 4 are rolled toward the position indicated by the chain line and are consequently caused to produce a locking motion.

The sockets 22 are intended to keep the tubular rollers 4 from being moved in one direction while the spool c is slid over the winding shaft 1. Thus, they are not essential components.

Figure 36:
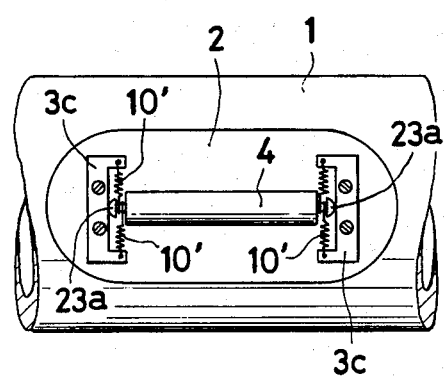
FIG. 36 is a plan view of another embodiment of the present invention which has a similar function to the embodiment of FIG. 34.

In the embodiment of FIG. 36, the rollers 4 are not tubes but are solid round bars. Screws 23*a* are fastened to the opposite ends of the roller 4. The heads of these screws 23*a* are retained at the centers of the flat recesses 2 by means of the coil springs 10' extended from the roller supporting frames 3*c*. The supporting frames 3*c* are secured on the flat recesses 2 with screws.

Figure 37:
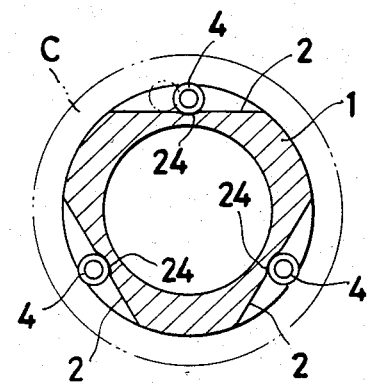

FIG. 37 represents an embodiment wherein shallow grooves 24 are formed one each along the centers of the flat recesses 2 to retain the rollers 4 along the center lines of the flat recesses 2, so that the rollers are now allowed to move randomly out of the center lines and produce a locking motion while the spool c is being slid over the winding shaft 1.

Apart from the flat recesses 2 of the two-way locking system, the recesses may be slightly lowered at the center as illustrated in FIG. 38, so that only slight rolling of the rollers 4 will produce a quick locking motion. Conversely, the recess may be slightly raised at the center as illustrated in FIG. 39, so that the generation of a locking motion by the rolling of the rollers 4 may be retarded. Such modifications are obtained by suitably changing the shape of the recesses.

Whether the roller supporting frames 3, 3a, 3b, and 3c are used or not, the axles 9 adopted for tubular rollers, opposite protuberances adopted for solid bar rollers, and coil springs 10, 10' adopted for both rollers serve effectively as means for retaining the rollers 4 in such a way that the rollers are allowed to be rolled and prevented from falling off the winding shaft. It is advantageous, however, that permanent magnets are used either alone or in combination with such roller retaining means as described above. If permanent magnets are buried at the positions at which the rollers produce no locking motion, the rollers 4 are kept attracted to the permanent magnets while the spool c is removed from the winding shaft 1. The rollers 4 thus attracted to the permanent magnets do not fall off unless they are forcibly pulled off. The embodiments of FIGS. 5 and 6 represent cases wherein permanent magnets 7 are used independently. The embodiments of FIGS. 9 and 30 represent cases wherein permanent magnets 7 are used for correcting the posture of the rollers to fall accurately in the axial direction after the rollers 4 have returned to the positions at which they produce no locking motion.

Now, embodiments wherein no supporting frames are needed in retaining the rollers 4 on the flat recesses 2 in such a manner that the rollers may be allowed to roll on the flat recesses 2 and prevented from falling off the winding shaft 1 will be described with reference to FIGS. 40–45. FIG. 40 represents an embodiment wherein permanent magnets 7 are buried in flat recesses which are formed by cutting surface segments off the cylinder of the winding shaft 1. The distance for the rolling motion of the roller 4 on the flat recess is determined by stop pins 28 raised at the front and rear sides of the buried magnets. The pin 28 which serves to stop the roller 4 at the position most separated from the peripheral surface of the winding shaft 1 is naturally essential. The other pin 28 raised at the shallow portion of the flat recess is useful for the purpose of preventing the roller 4 from forcing its way excessively into the inner surface of the spool c. Whenever the spool c is pulled out of the winding shaft 1, the rollers 4 are held in contact with the pin 28 at the positions of the largest depth without fail. At these positions, the rollers 4 are attracted by the permanent magnets 7 and, therefore, are prevented from falling off the flat recesses.

FIG. 41 represents an embodiment wherein protuberances 8 formed on the opposite ends of the rollers 4 are admitted into the lateral grooves 11 on the opposite side walls of the flat recesses and allowed to roll along the lateral grooves 11 so as to keep the rollers from falling off the flat recesses. FIGS. 42, 43 represent lateral cross sections of the construction of FIG. 41. The lateral grooves in the aforementioned roller supporting frames are formed directly in the opposite side walls of the flat recesses on the winding shaft 1. The protuberances 8 at the ends of the rollers may be replaced by the ends of the axle 9 of FIGS. 16, 17.

FIGS. 44, 45 represent an embodiment wherein discontinuous flat recesses 2' are formed by discontinuing the cutting of surface segments off the cylinder of the winding shaft 1 part way in the whole cutting length. The discontinuous flat recesses 2' provide surfaces for the rolling of the rollers 4. The opposite walls 29 of the recesses serve as surfaces for guiding the rollers. The recesses are desired to be flat throughout their area when they are covered with roller supporting frames. The discontinuous flat recesses may be advantageously used where they are not covered with roller supporting frames. Otherwise, when the discontinuous flat recesses 2' are given a slightly larger width and roller supporting frames, particularly supporting frames 3a of FIG. 2 which are divided into two sides, are attached to the recesses 2', the troublesome machining otherwise involved in forming lateral grooves 11 in the opposite side wall of the flat recesses as illustrated in FIGS. 42, 43 can be eliminated.

Finally, embodiments in which the present invention is applied to collars set on the periphery of composite winding shafts will be described with reference to FIG. 46 and the figures following.

Figure 47:
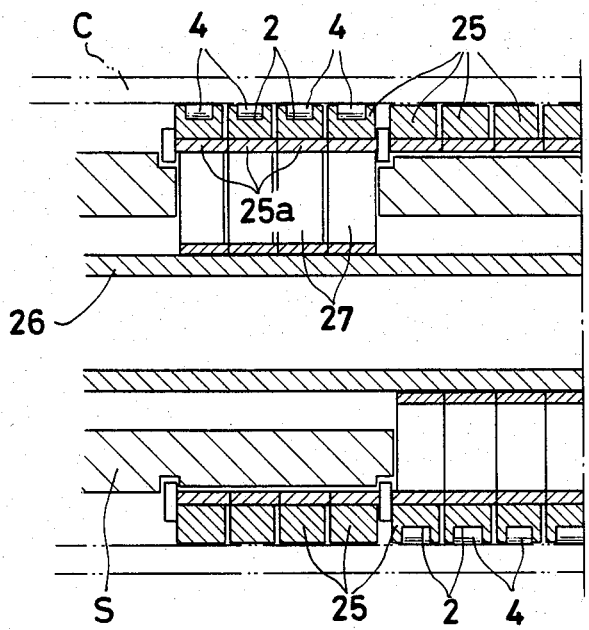
FIGS. 47 and 48 are a partial longitudinal cross section and a lateral cross section of the composite winding shaft.
Figure 48:
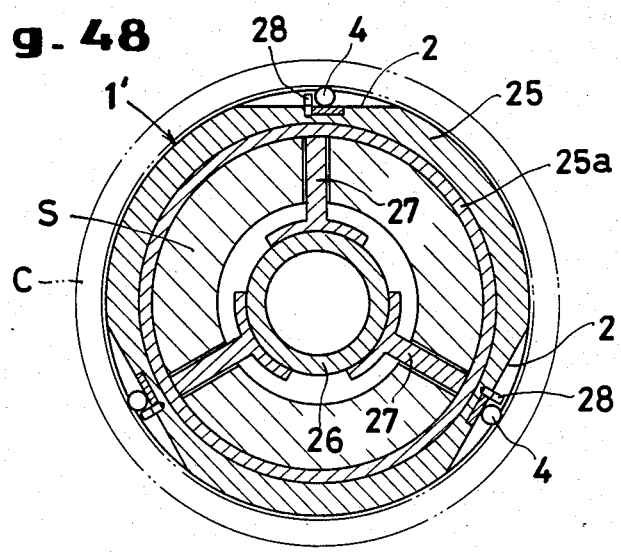

FIG. 46 represents an explanatory diagram illustrating the condition in which the composite winding shaft 1' is operated. The outer peripheries at the positions to be slid over by spools c are formed with groups of adjoining collars 25. All the collars are uniformly driven frictionally by the air pressure inside the shaft and are rotated in conjunction with the drive shaft S. The inner construction is schematically illustrated in FIGS. 47, 48. As the air pressure inside the rubber hose 26 which is passed through the hollow drive shaft S is increased, the friction lugs 27 are forced out through the oblong holes bored in the shaft S and directed to press the collars 25 against the inner wall of the spools c through the medium of frictional wheels 25a. When the drive shaft S is set rotating while the collars are held against the spool c, the frictional lugs 27 caught in the holes of the shaft S frictionally drive the collars 25. When a plurality of spools c of different lengths are simultaneously set on the winding shaft and they are rotated to wind thereon strips of sheet material, the spools c receive driving forces proportionate to their respective lengths. Moreover, the driving forces thus exerted can be accurately regulated by the air pressure.

The outer peripheries of these collars 25 contain flat recesses of the present invention. The rollers 4 are contained on these flat recesses 2 and operated to produce a locking motion. The roller retaining means which are to be fastened to the collars of a small width are desired to be simple to permit convenient operation. In the embodiment of FIG. 49, flat recesses 2 are formed on the outer peripheries of the collars 25 and permanent magnets 7 are buried under the flat recesses. FIG. 50 represents an embodiment in which the adjoining collars 25 are utilized for the purpose of preventing the rollers 4 from being moved laterally. Permanent magnets 7 are buried in the bottom faces and side walls. Just one stop pin 28 (shown in FIG. 48) is raised from the flat recess 2 so that it may stop the roller 4 after the roller has returned to the position most separated from the peripheral surface of the winding shaft.

Another embodiment of the high-class composite winding shaft 1' having groups of collars 25 as illustrated in FIG. 46 is illustrated in FIGS. 51, 52. Roller supporting frames 3b are attached each with two screws 23 to the flat recesses 2 on the outer peripheries of the collars 25. In this case, rigid steel balls 20 are set in the leading ends of the frictional lugs 27 which are liable to be worn readily. Each of the collars 25 is frictionally driven with three steel balls 20. The composite winding shaft 1' illustrated in FIG. 53 is of a relatively old type which conveys the rotation of the drive shaft S to all the collars 25 by virtue of the squeeze applied by the female screws 30 to the compression springs 31 instead of using air pressure. The locking of the collars 25 and the spools c is accomplished similarly to the embodiment of FIGS. 51, 52 by means of the roller supporting frames 3b and the rollers 4 (not shown) of the present invention. The collars 25 may be those of the design of FIGS. 21, 52 or those of the design of FIGS. 47, 48. The winding shafts of this particular type have a disadvantage that the drive torques of the collars 25 are variable with the positions of the collars.

In any event, the flat recesses 2 disposed equidistantly in the circumferential direction on the outer periphery of the individual collars 25 are flat surfaces which are formed by cutting surface segments of a desired width off the discs of the collars perpendicularly to the axes of the collars. The composite winding shaft making use of the present invention is obtained by adding to these flat recesses, rolling bars and roller retaining means similar to these in the various embodiments described above. Consequently, there is produced a high-class winding shaft enjoying the merits of this invention.

This invention has been described with reference to various embodiments thereof. The rollers and their rolling surfaces used in the present invention are smaller in width and larger in quantities than the counter types used in the conventional winding shafts. The rolling surfaces or flat recesses are formed by transverse cutting instead of longitudinal cutting along the axis of rotation as used in the conventional devices. Thus, the amount of cutting is smaller and the ease of cutting is greater in the winding shafts of this invention. Further, the rollers adapted to be rolled on the flat recesses are retained in such a manner that they may be allowed to roll but are prevented from falling off the flat recesses. Thus, this invention provides effective roller retaining means which are easy to fabricate. Roller-locking type winding shafts, therefore, can be produced with great efficiency when the roller supporting frames are mass produced by precision molding, the numerous flat recesses on the winding shafts are completed by one-stroke transverse cutting, and they are assembled together with the rollers in an assembly line.

The various embodiments described above may be easily modified and applied in accordance with designers' well-known techniques without altering the features of this invention described above, to suit required conditions.

I claim:

1. A composite winding shaft for a strip of sheet material provided on the surface thereof with rollers for fixing a spool, comprising groups of a multiplicity of spaced collars of a very small width and a drive shaft pierced through the centers of said spaced collars and adapted to cause frictional driving of said collars; flat recesses disposed equidistantly in the circumferential direction on the outer peripheries of said collars, said flat recesses being flat surfaces formed by cutting surface segments of a required width off the discs of said collars perpendicularly to the axes of said collars; rolling bars capable of being rolled on said flat recesses in a posture parallel to the axis of said winding shaft, said rolling bars having a thickness such that even when they are located at the positions most separated from the peripheral surface of said winding shaft, they slightly protrude from the peripheral surfaces of said collars and, as they roll off said positions, they protrude increasingly more from said peripheral surfaces; and means for restraining said rolling bars in such a manner that said rolling bars may be allowed to roll on said flat recesses and prevented from falling off said flat recesses, said means comprising rolling bar supporting frames attached one each to said flat recesses in such a manner that they avoid protruding from the peripheral surfaces of said flat recesses and axles passed through the holes bored in said rolling bars, said axles having the opposite ends thereof inserted in the opposed lateral grooves in said supporting frames and allowed to be moved in a short distance in consequence of the rolling of said rolling bars.

2. A winding shaft for a strip of sheet material, said winding shaft being provided on the surface thereof with rolling bars for fixing a spool, said winding shaft comprising:
   flat recesses disposed equidistantly in the circumferential direction on the outer periphery of the winding shaft, said flat recesses being flat surfaces formed by cutting surface segments of a width slightly larger than the length of rolling bars off the outer periphery of the winding shaft;
   opposed side walls defining the axial ends of said flat recesses, said opposed side walls having opposed lateral grooves formed in their lower portions;
   rolling bars each having hollow portions formed on the opposite ends thereof and being capable of being rolled on said flat recesses in a posture parallel to the axis of the winding shaft, said rolling bars having a thickness such that, even when they are located at the positions most separated from the peripheral surface of the winding shaft, they slightly protrude from the peripheral surface of the winding shaft and, as they roll from said positions, they protrude increasingly from said peripheral surface; and
   means for restraining said rolling bars in such a manner that said rolling bars are allowed to roll on said flat recesses but are prevented from falling off said flat recesses, said means comprising axles of a diameter smaller than the diameter of said hollow portions of said rolling bar and said opposed lateral grooves formed in the said opposite side walls, the end portions of each of said axles, when passed through said hollow portions of said rolling bars, entering said lateral grooves and being allowed to move independently in a straight line parallel to said flat surfaces over a necessary distance in consequence of the rolling motion of said rolling bars to enable said rolling bars to protrude greatly.

3. A winding shaft according to claim 2 wherein:
   (a) each of said rolling bars is a single pipe and
   (b) each of said axles is a single rod piercing through said single pipe and having a length allowing the end portions thereof to enter said opposed lateral grooves.

4. A winding shaft according to claim 2 wherein:
   (a) each said rolling bars is a single circular rod having hollow portions at the opposite ends thereof, each of said hollow portions having a bottom at the axial inner end thereof, and
   (b) each of said axles is composed of two rods having a diameter much smaller than the diameter of said hollow portions and having a length allowing one end of each of said rods to reach the bottoms of said hollow portions and the other end of each of said rods to enter one of said opposed lateral grooves.

5. A winding shaft according to claim 2 wherein:
(a) each of said rolling bars is a single circular rod having hollow portions at the opposite ends thereof and
(b) each of said axles has a major-diameter portion adapted to be slidably fitted in the hollow portion of the corresponding rolling bar and a minor-diameter portion adapted to move within one of said lateral grooves.

6. A winding shaft for a strip of sheet material, said winding shaft being provided on the surface thereof with rolling bars for fixing a spool, said winding shaft comprising:

flat recesses disposed equidistantly in the circumferential direction on the outer periphery of the winding shaft, said flat recesses being flat surfaces formed by cutting surface segments of a required width off the outer periphery of the winding shaft from one side to the other thereof;

rolling bar supporting frames attached one each to said flat recesses and each having a peripheral surface flush with the peripheral surface of the winding shaft, opposite lateral walls for guiding the opposite end portions of the associated one of said rolling bars rolling on the central portion of the associated one of said flat recesses, and opposite lateral grooves formed in the lower portions of said opposite lateral walls;

rolling bars capable of being rolled on said flat recesses within said supporting frames in a posture parallel to the axis of the winding shaft, said rolling bars having a thickness such that, even when they are located at the positions most separated from the peripheral surface of the winding shaft, they slightly protrude from the peripheral surface of the winding shaft and, as they roll from said positions, they protrude increasingly from said periperal surface; and means for restraining said rolling bars in such a manner that said rolling bars are allowed to roll on said flat recesses but are prevented from falling off said recesses, said means comprising relatively slender protuberances projecting from the opposite end portions of each of said rolling bars into said opposite lateral grooves and, when reaching the edges of said opposite lateral grooves, allowing said rolling bars to move independently in a straight line parallel to said flat surfaces until said rolling bars protrude greatly from the peripheral surface of the winding shaft.

7. A winding shaft for a strip of sheet material, said winding shaft being provided on the surface thereof with rolling bars for fixing a spool, said winding shaft comprising:

flat recesses disposed equidistantly in the circumferential direction on the outer periphery of the winding shaft, said flat recesses being flat surfaces formed by cutting surface segments of a required width off the outer periphery of said winding shaft from one side to the other thereof;

rolling bars each having hollow portions formed on the opposite ends thereof and being capable of being rolled on said recesses in a posture parallel to the axis of the winding shaft, said rolling bars having a thickness such that, even when they are located at the positions most separated from the peripheral surface of the winding shaft, they slightly protrude from the peripheral surface of the winding shaft and, as they roll from said positions, they protrude increasingly from said peripheral surface;

rolling bar supporting frames attached one each to said flat recesses in such a manner that they do not protrude from the peripheral surface of the winding shaft, said rolling bar supporting frames being provided with opposite lateral walls for guiding the opposite end portions of the associated one of said rolling bars rolling on the central portion of said flat recesses, said rolling bar supporting frames being further provided with opposite lateral grooves formed in the lower portions of said opposite lateral walls; and means for restraining said rolling bars in such a manner that said rolling bars are allowed to roll on said flat recesses but are prevented from falling off said flat recesses, said means comprising axles of a diameter much smaller than the diameter of said hollow portions of said rolling bars and opposed lateral grooves formed in the lower edges of said rolling bar supporting frames, the end portions of each of said axles, when passing through said hollow portions of said rolling bars, entering said lateral grooves and being allowed to move independently in a straight line parallel to said flat surfaces over a necessary distance in consequence of the rolling motion of said rolling bars to enable said rolling bars to protrude greatly.

8. A winding shaft according to claim 7 wherein each of said rolling bar supporting frames has a peripheral surface flush with the peripheral surface of the winding shaft and is fastened with sunk bolts to the opposite end portions of the associated one of said flat recesses in the axial direction of the winding shaft.

9. A winding shaft according to claim 7 wherein each of said rolling bar supporting frames in formed in the shape of a window frame and is fastened with sunk bolts to the opposite end portions of the associated one of said flat recesses in the axial direction of the winding shaft.

10. A winding shaft for a strip of sheet material, said winding shaft being provided on the surface thereof with rolling bars for fixing a spool, said winding shaft comprising:

a combination of a bar of a polygonal cross section and surface segments attached to the flat surfaces forming the outer periphery of said polygonal bar, said surface segments having outer surfaces such as to convert the surface of said polygonal bar into a circular surface smoothly fitting the inner surface of a winding spool, said surface segments further having a length such as to expose part of the surface of said polygonal bar for permitting rolling bars to be rolled thereon;

rolling bar supporting frames attached one each to said flat surfaces and each having a peripheral surface flush with the peripheral surface of the winding shaft, opposite lateral walls for guiding the opposite end portions of the associated one of said rolling bars rolling on the central portion of the associated one of said flat surfaces, and opposite lateral grooves formed in the lower portions of said opposite lateral walls;

rolling bars each having hollow portions formed on the opposite ends thereof and being capable of being rolled on the surface of said polygonal bar exposed between said surface segments, said rolling bars having a thickness such that, even when they are located at the positions most separated from the peripheral surface of the winding shaft, they slightly protrude from the peripheral surface of the winding shaft and, as they roll from said positions, they protrude increasingly from said peripheral surface; and means for restraining said rolling bars in such a manner that said rolling bars are allowed to roll on said flat surfaces but are prevented from falling off said flat surfaces said means comprising axles of a diameter much smaller than the diameter of said hollow portions of said rolling bars and said opposed lateral grooves in said rolling bar supporting frames, the end portions of each of said axles, when passed through said hollow portions of said rolling bars, entering said lateral grooves and being allowed to move independently in a straight line parallel to said flat surfaces over a necessary distance in consequence of the rolling motion of said rolling bars to enable said rolling bars to protrude greatly.

11. A winding shaft for a strip of sheet material, said winding shaft being provided on the surface thereof with rolling bars for fixing a spool, said winding shaft comprising;

a spool supporting member set round a driven shaft to support and restrain locally the inner surface of a spool for winding thereon a strip of sheet material, said spool supporting member having the shape of a short tube and being provided on the outer periphery thereof with flat recesses disposed equidistantly in a circumferential direction on said outer periphery, said flat recesses being flat surfaces formed by cutting surface segments of a required width off the wall of said tube from one end to the other thereof;

rolling bars each having hollow portions formed on the opposite ends thereof and being capable of being rolled on said flat recesses in a posture parallel to the axis of said tubular supporting member, said rolling bars having a thickness such that, even when they are located at the positions most separated from the peripheral surface of the winding shaft, they slightly protrude from the peripheral surface of the winding shaft and, as they roll from said positions, they protrude increasingly from said peripheral surface;

rolling bar supporting frames attached one each to said flat recesses in such a manner that they do not protrude from the peripheral surface of the winding shaft, said rolling bar supporting frames being provided with opposite lateral walls for guiding the opposite end portions of the associated one of said rolling bars rolling on the central portion of the associated one of said flat recesses, said rolling bar supporting frames being further provided with opposite lateral grooves formed in the lower portions of said opposite lateral walls; and means for restraining said rolling bars in such a manner that said rolling bars are allowed to roll on said flat recesses but are prevented from falling off said flat recesses, said means comprising axles of a diameter much smaller than the diameter of said hollow portions of said rolling bars and said opposed lateral grooves in said rolling bar supporting frames, the end portion of each of said axles, when passed through said hollow portions of said rolling bars, entering said lateral grooves and being allowed to move independently in a straight line parallel to said flat surfaces over a necessary distance in consequence of the rolling motion of said rolling bars to enable said rolling bars to protrude greatly.

12. A winding shaft according to claim 11 wherein said spool supporting member comprises adapters which are set in position inside the opposite ends of a spool in which are easily attached to and detached from the shaft head of a drive shaft for winding.

13. A winding shaft for a strip of sheet material, said winding shaft being provided on the surface thereof with rolling bars for fixing a spool, said winding shaft comprising:

flat recesses disposed equidistantly in the circumferential direction on the outer periphery of the winding shaft, said flat recesses being flat surfaces formed by cutting surface segments of a required width off the outer periphery of the winding shaft from one side to the other thereof;

rolling bars capable of being rolled on said flat recesses in a posture parallel to the axis of the winding shaft, said rolling bars having a thickness such that, even when they are located at the positions most separated from the peripheral surface of the winding shaft, they slightly protrude from the peripheral surface of the winding shaft and, as they roll from said positions, they protrude increasingly from said peripheral surface; and means for restraining said rolling bars in such a manner that said rolling bars are allowed to roll on said flat recesses but are prevented from falling off said flat recesses, said means comprising coil springs serving to connect each of said rolling bars along the central lines on said flat recesses parallel to the axis of the winding shaft to set screws at the opposite ends of said flat recesses, and sockets through which said coil springs are passed for retaining the distance between one of said set screws and one of the opposite ends of said rolling bar equal to the distance between the other set screw and the other end of said rolling bar, whereby said rolling bars are allowed to move independently in a straight line parallel to said flat surfaces.

14. A winding shaft for a strip of sheet material, said winding shaft being provided on the surface thereof with rolling bars for fixing a spool, said winding shaft comprising:

flat recesses disposed equidistantly in the circumferential direction on the outer periphery of the winding shaft, said flat recesses being flat surfaces formed by cutting surface segments of a width slightly larger than the length of rolling bars off the outer periphery of the winding shaft from one side to the other thereof;

opposed side walls defining the axial ends of said flat recesses, said opposed side walls having opposite lateral grooves formed in their lower portions;

rolling bars capable of being rolled on said flat recesses in a posture parallel to the axis of the winding shaft, said rolling bars having a thickness such that, even when they are located at the positions most separated from the peripheral surface of the winding shaft, they slightly protrude from the peripheral surface of the winding shaft and, as they roll from said positions, they protrude increasingly from said peripheral surface; and means for restraining said rolling bars in such a manner that said rolling bars are allowed to roll on said flat recesses but are prevented from falling off said flat recesses, said means comprising bolts perpendicularly driven into the winding shaft at said flat recesses to stand upright therein, said lateral grooves in said opposite side walls, and protuberances entering said lateral grooves from the opposite ends of each of said rolling bars, whereby said rolling bars are allowed to move independently in a straight line parallel to said flat surfaces.

15. A composite winding shaft for a strip of sheet material, said composite winding shaft being provided on the surface thereof with rolling bars for fixing a spool, said composite winding shaft comprising:

groups of a multiplicity of adjoining collars;

a drive shaft pierced through the centers of said adjoining collars and adapted to cause frictional driving of said collars;

flat recesses disposed equidistantly in a circumferential direction on the outer peripheries of said collars, said flat recesses being flat surfaces formed by cutting surface segments of a width slightly larger the length of rolling bars off the outer peripheries of said collars perpendicularly to the axes of said collars from one side to the other thereof;

opposed side walls defining the axial ends of said flat recesses, said opposed side walls having opposed lateral grooves formed in their lower portions;

rolling bars capable of being rolled on said flat recesses in a posture parallel to the axis of the winding shaft, said rolling bars having a thickness such that, even when they are located at the positions most separated from the peripheral surface of the winding shaft, they slightly protrude from the peripheral surfaces of said collars and, as they roll from said positions, they protrude increasingly from said peripheral surface; and means for restraining said rolling bars in such a manner that said rolling bars are allowed to roll on said flat recesses but are prevented from falling off said flat recesses, said means comprising bolts perpendicularly driven into the winding shaft at said flat recesses to stand upright therein, said lateral grooves in said opposite sidewalls, and protuberances entering said lateral grooves from the opposite ends of said rolling bars, whereby said rolling bars are allowed to move independently in a straight line parallel to said flat surfaces.

16. A winding shaft for a strip of sheet material, said winding shaft being provided on the surface thereof with rolling bars for fixing a spool, said winding shaft comprising:

flat recesses disposed equidistantly in the circumferential direction on the outer periphery of the winding shaft, said flat recesses being flat surfaces formed by cutting surface segments of a required width off the outer periphery of said winding shaft from one side to the other thereof;

rolling bars in the form of pipes each of which is capable of being rolled on a corresponding one of said recesses in a posture parallel to the axis of the winding shaft, said rolling bars having a thickness such that, even when they are located in the positions most separated from the peripheral surface of the winding shaft, they slightly protrude from the peripheral surface of the winding shaft and, as they roll from said positions, they protrude increasingly from said peripheral surface;

rolling bar supporting frames attached one each to said flat recesses in such a manner that they do not protrude from the peripheral surface of the winding shaft, said rolling bar supporting frames being provided with opposite lateral walls for guiding the opposite end portions of the associated one of said rolling bars rolling on the central portion of said flat recesses, said rolling bar supporting frames being further provided with opposite lateral grooves formed in the lower portions of said opposite lateral walls; and means for restraining said rolling bars in such a manner that said rolling bars are allowed to roll on said flat recesses but are prevented from falling off said flat recesses, said means comprising coiled springs one of which pierces through each of said rolling bars and has its two ends connected to said opposite lateral grooves of the corresponding one of said rolling bar supporting frames to bias said rolling bars toward their positions most separated from the peripheral surface of said winding shaft.

* * * * *